ENCASING PROCESS FOR PRESS ELECTRODE SEMICONDUCTOR COMPONENTS

Filed April 15, 1969

United States Patent Office 3,611,564

Patented Oct. 12, 1971

3,611,564

ENCASING PROCESS FOR PRESS ELECTRODE SEMICONDUCTOR COMPONENTS

Francis H. Boulet, Bures-sur-Yvette, and Roger H. Balteaux, Athis-Mons, France, assignors to Compagnie Generale d'Electricite, Paris, France Filed Apr. 15, 1969, Ser. No. 816,255
Claims priority, application France, Apr. 17, 1968, 148,424
Int. Cl. H01r 9/00
U.S. Cl. 29—630 A 4 Claims

ABSTRACT OF THE DISCLOSURE

An encasing process for press electrode semiconductor components consisting of making the electrodes undergo prestress at a pressure higher than that which they would have to undergo during normal operation before placing them on the component and polishing the surfaces of the electrodes which are to be applied to the semiconductor component.

The present invention relates to an improvement in the manufacture of power semiconductor devices, and more particularly to a method of preparing a solid electrode intended to make contact with associated component means in the assembled device by resilient pressure.

Power semiconductor devices, such as rectifiers and thyristors, have to withstand considerable currents at their main electrodes, i.e., the anode and the cathode, during operation. The main electrodes are therefore preferably made in the form of solid metallic members consisting of a material of good electrical and thermal conductivity. Generated heat is generally dissipated by mechanical coupling of the power device to a radiator, the volume and developed surface of which are made to perform this function. In a known form of coupling of a semiconductor device to a radiator, the semiconductor device may be enclosed in a fluid-tight capsule which is disposed between two solid metallic members provided with fins. The metallic members bear on the main semiconductor electrodes and are maintained in the assembled condition by pressure applied to the solid members constituting the radiator. Pressure on the main electrodes is applied by gripping together the two solid members of the radiator by any means, for example, by an assembly of screwthreaded rods locked by means of nuts.

By way of example, the applicants have described in their French patent specification No. 1,520,554 of the 17th of February 1967, a semiconductor capsule which, during operation, is maintained between two solid radiator members by pressure on the main electrodes.

Figure 1:
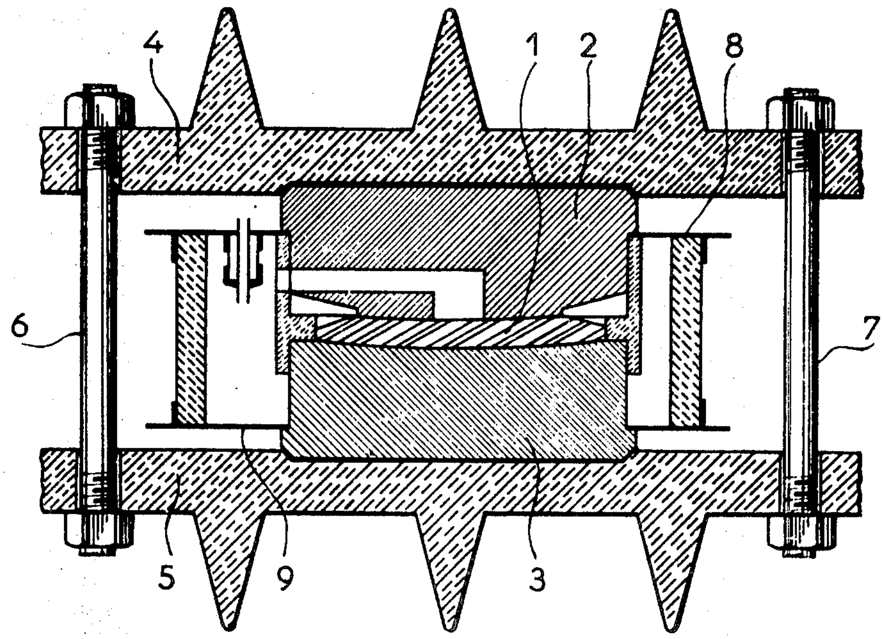
FIG. 1 is a sectional view of a capsule having pressure located electrodes of a known type.

FIG. 1 of the accompanying drawings is a sectional view of such a capsule with pressure located electrodes of a known type. The solid electrodes 2 and 3 consist of thermally and electrically conductive material such as copper and are maintained between radiator members 4 and 5 by pressure resulting from the tightening of two tie bolts 6 and 7.

In order to insure good contact, the pressure on the electrodes in such a device must be from 300 to 400 kilograms per square centimeter.

While such an arrangement insures good electrical contact and a satisfactory dissipation of generated heat, it does suffer from certain disadvantages. This is because the electrodes 2 and 3 consist of copper, and their connection to the electrodes of surrounding collars 8 and 9 respectively is effected by soldering which takes place at such a temperature so as to produce annealing of the electrodes. This annealing of the electrodes renders them highly deformable under pressure. Consequently, the semiconductor 1 is subjected to stressing during final assembly as a result of the deformation of the surfaces of the electrodes 2 and 3, as shown in FIG. 1. In fact, the deformation has been exaggerated for the sake of clarity.

The present invention eliminates these heretofore undesirable effects and provides a method of manufacturing a solid electrode for use in power semiconductor devices. The electrode is made of a pressure deformable metal and is intended to make contact with associated component means in the assembled device by resilient pressure. The method is characterized in that the electrode is subjected to an initial compression which is higher than the operational pressure to which the electrode is to be subjected, and then to a surface grinding operation which is applied to the face or faces of the electrode intended to make the aforesaid contact.

A layer of malleable metal of good conductivity, such as silver, gold or platinum, may be deposited on each ground face. The deposited metal may also be subjected to a surface grinding operation.

The introduction of the semiconductor assembly into a capsule, the closing of the capsule and mechanical coupling thereof to radiator means by pressure applied to the semiconductor main electrodes is then effected in the previously set forth known manner.

The present invention also provides a power semiconductor device comprising a semiconductor assembly maintained between two electrodes by resilient pressure, in which the metal of at least one of the electrodes is cold-worked by initial pressure on the electrodes. The electrode may consist of cold-worked copper.

Figure 2:
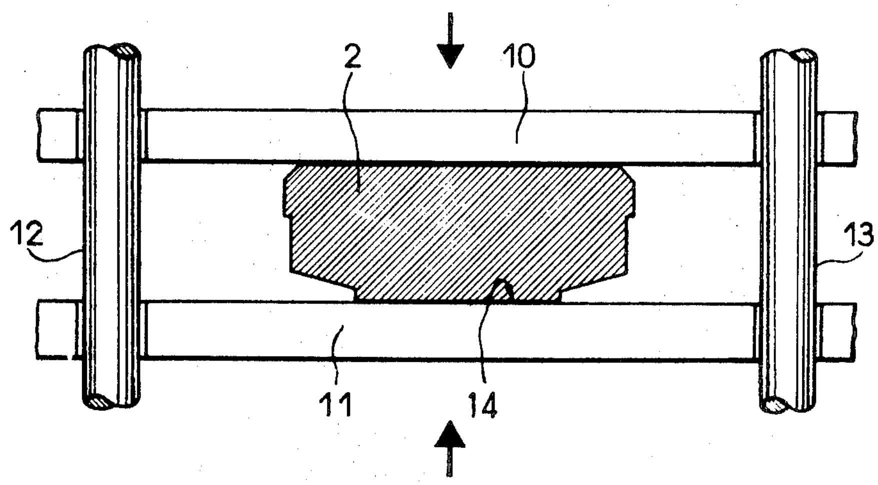
FIG. 2 is a sectional view of the apparatus according to the present invention.

The apparatus for carrying out the method of the present invention in the case of a thyristor, as shown in FIG. 1, will now be described by way of example, with reference to FIG. 2. FIG. 2 is a sectional view of the apparatus which may be employed to apply the initial compression to one of the electrodes.

This apparatus consists essentially of two solid plates 10 and 11 of, for example, hard steel of which at least the opposed faces have a hardness greater than that of the copper of the electrodes 2 and 3, and are carefully made true. These plates are mounted so as to slide, while remaining parallel to one another, along guide columns 12 and 13.

There is first introduced between these plates 10, 11, one of the electrodes 2 as shown in FIG. 2 and then there is exerted on the plates 10, 11 a pressure by means of a press (not shown) which is higher than that which the electrode will undergo in normal operation, for example, 600 kg./cm.$^2$, while the operating pressure may be only 300–400 kg./cm.$^2$. The same treatment is thereafter applied to the other electrode 3 in the same apparatus shown in FIG. 2.

After the initial compression of the two electrodes, the second operation according to the invention is performed. The second operation consists of grinding the inside faces of the electrodes, face 14 of the electrode 2, such that only the most cold-worked surface layer of the copper is removed, the electrodes remaining absolutely plane.

A layer of silver is thereafter applied to the inside face 14 of the electrode 2 by any known method, for example, by electrolytic deposition. If, for example, the semiconductor element consists of gold-coated silicon, this silver layer prevents the gold from diffusing into the copper of the electrode 2 during operation of the semiconductor device.

After the layer of silver is applied, further grinding of the inside face 14 may be effected in order to render it absolutely plane again and to give it the surface needed for optimum contact quality. The fitting of the semiconductor 1, the closing of the fluid-type capsule, and the coupling of the whole assembly with radiator means are thereafter effected in a known manner.

Of course, the method according to the invention is not limited to the assembly of the thyrister described by way of example, but it is equally well applicable to the assembly of all types of rectifiers having pressure contact electrodes, and also to semiconductor devices having any number of electrodes which are used in an assembly under pressure.

We claim:

1. The method of manufacturing a solid electrode for use in a power semiconductor device wherein said electrode is made of pressure deformable metal and is intended to make contact with associated component means in the assembled device by resilient pressure comprising the steps of: subjecting the electrode prior to assembly sequentially to precompression which is higher than the operational pressure to which the electrode is to be subjected; and surface grinding one or more of the contact faces of the electrode to relieve the cold-working thereof.

2. The method of manufacture set forth in claim 1 including the additional step of depositing a layer of several microns in thickness of malleable metal of good conductivity on one or more of said ground faces.

3. The method of manufacture as set forth in claim 2 wherein the deposited metal is subjected to a surface grinding operation.

4. The method of manufacture set forth in claim 2 wherein the deposited metal is selected from the group consisting of silver, gold or platinum.

References Cited

UNITED STATES PATENTS

| | | | |
|---|---|---|---|
| 3,518,507 | 6/1970 | Bezouska et al. | 317—234.6 |
| 3,476,986 | 11/1969 | Tsuji | 317—234.6 |
| 3,457,472 | 7/1969 | Mulski | 29—591 |
| 3,226,466 | 12/1965 | Martin | 317—234.6 |

JOHN F. CAMPBELL, Primary Examiner

D. M. HEIST, Assistant Examiner

U.S. Cl. X.R.

29—589, 590